(12) United States Patent
Paukkunen et al.

(10) Patent No.: US 6,620,447 B1
(45) Date of Patent: Sep. 16, 2003

(54) METHOD FOR MAKING A BAKED PRODUCT

(75) Inventors: Veli-Matti Paukkunen, Ikaalinen (FI); Pirjo Alho-Lehto, Turku (FI); Petri Liimatainen, Raisio (FI)

(73) Assignee: Raisio Yhtyma Oyj, Raisio (FI)

( * ) Notice: Subject to any disclaimer, the term of this patent is extended or adjusted under 35 U.S.C. 154(b) by 0 days.

(21) Appl. No.: 09/693,916

(22) Filed: Oct. 23, 2000

Related U.S. Application Data (63) Continuation-in-part of application No. 09/319,221, filed as application No. PCT/FI97/00739 on Dec. 1, 1997, now abandoned.

(30) Foreign Application Priority Data

Dec. 4, 1996 (FI) .................................................. 964850

(51) Int. Cl.[7] .......................... B65B 25/16; B65B 25/22
(52) U.S. Cl. ....................... 426/412; 426/415; 426/395; 426/496
(58) Field of Search ............................. 426/412, 415, 426/496, 128, 113, 118, 8, 395

(56) References Cited

U.S. PATENT DOCUMENTS

| | | | | |
|---|---|---|---|---|
| 1,411,223 A | * | 3/1922 | Retzback | |
| 4,120,984 A | * | 10/1978 | Richardson et al. | 426/412 |
| 4,243,074 A | * | 1/1981 | Strutzel et al. | 138/118.1 |
| 4,426,401 A | * | 1/1984 | Ottow et al. | 426/394 |
| 4,666,750 A | * | 5/1987 | Hammer et al. | 428/36 |
| 4,793,324 A | * | 12/1988 | Caferro | 126/369 |
| 4,894,247 A | * | 1/1990 | Fong | 426/107 |
| 4,911,938 A | * | 3/1990 | Fisher et al. | 426/107 |
| 5,045,333 A | * | 9/1991 | Petrofsky et al. | 426/394 |
| 5,314,702 A | * | 5/1994 | Lewandowski et al. | 426/128 |
| 6,242,024 B1 | * | 6/2001 | Perry et al. | 426/118 |

FOREIGN PATENT DOCUMENTS

| | | | |
|---|---|---|---|
| DE | 44 04 675 A1 | | 8/1995 |
| EP | 0 240 071 A3 | | 10/1987 |
| GB | 953523 | * | 3/1964 |
| GB | 1008679 | * | 11/1965 |
| GB | 1271892 | * | 4/1972 |
| GB | 1 592 148 | | 7/1981 |
| JP | 73008505 | * | 6/1970 |
| WO | WO9107861 | * | 5/1991 |

* cited by examiner

*Primary Examiner*—Steven Weinstein
*Assistant Examiner*—Robert A. Madsen
(74) *Attorney, Agent, or Firm*—Connolly Bove Lodge & Hutz LLP (57) ABSTRACT

The present invention is related to the manufacture of a baked product with the product being enclosed in a wrapper. The product can be given good qualities including that desired surface portions of the product can be provided a crust similar to that achievable under open-pan baking conditions. The invention is implemented so that the dough is dosed into the baking volume formed by said sealed wrapper, subsequently baking the dough in said baking space formed by said sealed wrapper. In the wrapper, the wrapper area overlying the intended crust-formation area of the baked product is made of a moisture-permeable porous material capable of passing water vapour through its structure.

19 Claims, 5 Drawing Sheets

Fig. 10

METHOD FOR MAKING A BAKED PRODUCT

CROSS-REFERENCE TO RELATED APPLICATION

This application is a continuation-in-part of U.S. patent application Ser. No. 09/319,221 filed Jun. 3, 1999, now abandoned, which is the national phase of PCT/FI97/00739 filed Dec. 1, 1997.

The present invention relates to a method for making a baking product. Primarily, the method is intended for applications in a continuous manufacturing process. In the present context, the term baking product is used in making foodstuff products having their manufacturing process chiefly dictated by the grain fraction. The process outcome will naturally be affected also by other components of the grain fraction, mutual proportions and qualities, as well as the flour-water ratio used in making the dough.

Conventionally, bakery products are baked using either so-called open-hearth baking or pan-baking. In open-hearth baking, the baked product is made from a dough piece having a sufficient toughness for keeping the piece essentially in its intended shape until passed to the baking step. In contrast, pan-baking can be carried out using dough of essentially higher elasticity or otherwise lower consistency, because this baking technique is not so sensitive to the shape retention of the dough. As known, pan-baking can be carried out using either an open pan or a pan covered with a lid.

When baking in an open-hearth oven or open pan, an essential portion of the product surface is in immediate contact with the atmosphere of the oven. This imposes a significant moisture loss effect on the product during baking. In contrast, the pan is very tightly sealed when the baking takes place in a covered pan, whereby the evaporation of moisture almost completely prevented. Also known in the art are baking methods in which a covered pan is provided with a venting mechanism suitable for controlling the exhaust of evaporated moisture. Such a method is described in, e.g., U.S. Pat. No. 4,590,078.

Controlled removal of moisture from the baked product during baking is essential, e.g., in making a baked bread inasmuch it is known that the taste of bread can be improved by baking the bread at a lower temperature combined with a correspondingly longer baking time. Bakery products such as wheat rolls, for example, in turn require that excessive moisture loss from the product is prevented under such baking conditions that are known to give a good baking result within a balanced combination of baking temperature and time.

On the other hand, the crust of a baked product is expected to have some desirable qualities, combined at least for a portion of the crust with a pleasing appearance, such properties being achievable by virtue of conventional baking methods in which the crust of the product is brought to an immediate contact with the baking atmosphere of the baking oven.

A baked product fulfilling these requirements can be attained by means of a method which allows the product to stay during its manufacturing process enclosed in a sealed wrapper, according to the invention so that the dough is dosed into the baking space formed by said sealed wrapper to give the full-volume of the baked end product, subsequently raising and/or baking the dough in said baking space formed by said sealed wrapper, and that a wrapper is used in which the wrapper area overlying the crust-formation area of the baked product intended to simulate the baking result obtainable under open-hearth baking conditions is made from a moisture-transmissive material capable of passing water vapour through its porous structure from the product to the baking oven atmosphere.

Advantageously, the method is implemented using a sealed wrapper made from material whose water vapour transmission through its porous structure at room temperature is about 150–250 g/m$^2$*day. Said material should preferably be elastic with an elongation of about 12–20% under a pressure differential of 30 kPa.

The art of manufacturing a baked product enclosed in sealed wrapper has already been treated in a number of earlier patent publications. For instance, patent publication EP-A1-0240071 describes a baking method in which a prebaked bread is packed in a material capable of retaining the moisture and crispness of the product during the reheating of the prebaked product in a microwave oven. Similarly, in publication WO/91/07861 is described a method in which a prebaked bread is packaged in a sheet of moisture-semipermeable material that is wrapped about the product thus allowing the product to be reheated in a microwave oven without destroying the crisp crust of the product.

In patent publication GB-A-155000 is further described a method comprising heating of the product in a wrapper material at a maximum temperature of 135° C. for about 15 min, whereby pores fabricated on the wrapper material can vent the released water vapour out from the wrapper during heating but seal themselves off immediately after heating. The goal of the method is to provide an aseptic package, thus offering a good microbial protection after baking.

All these prior-art methods are characterized in that their object is to extend the microbiological shelf life of the prebaked product. They start from a piece of moulded and raised dough that is prebaked chiefly for the postprocessing needs of a consumer.

In the following, the invention will be elucidated with the help of examples.

EXAMPLE 1

Manufacture of a Rye Bread Product

The constitution of the product was as follows:

| Component | Weigh [kg] | % of flour weight |
|---|---|---|
| Fine rye flour | 30 | 100 |
| Dry yeast | 0.2 | |
| Salt | 0.7 | |
| Malt barley | 0.059 | |
| Water (+16 °C.) | 32 | 107 |
| Total | 63.0 | |

The particle distribution of the milled rye flour was:

| | |
|---|---|
| 265 μm or greater | 5% |
| 200 μm or greater | 19% |
| 150 μm or greater | 19% |
| 125 μm or greater | 16% |
| 100 μm or greater | 10% |

The ash content of flour was about 2% and the falling number (Hackberg) of flour was optimized to about 150 for dough mixing with malt barley flour.

The dough was prepared from the above-described raw materials into a vertical dough mixer. The mixing time was 7 min. The dough relax time was 60 min. Raising was carried out at 34–36° C. keeping the moisture content at 60–70%. The raising time was 30 min.

The product was baked at 210° C. for 45 min with the exhaust dampers of the oven held shut during baking.

Figure 1:
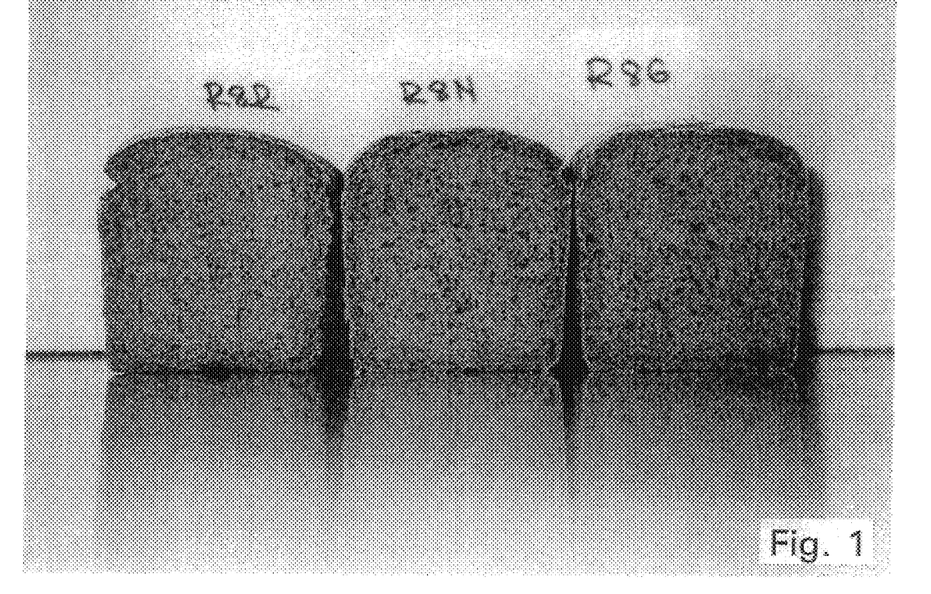
FIG. 1 shows cross sections of three rye breads made by pan-baking.
Figure 2:
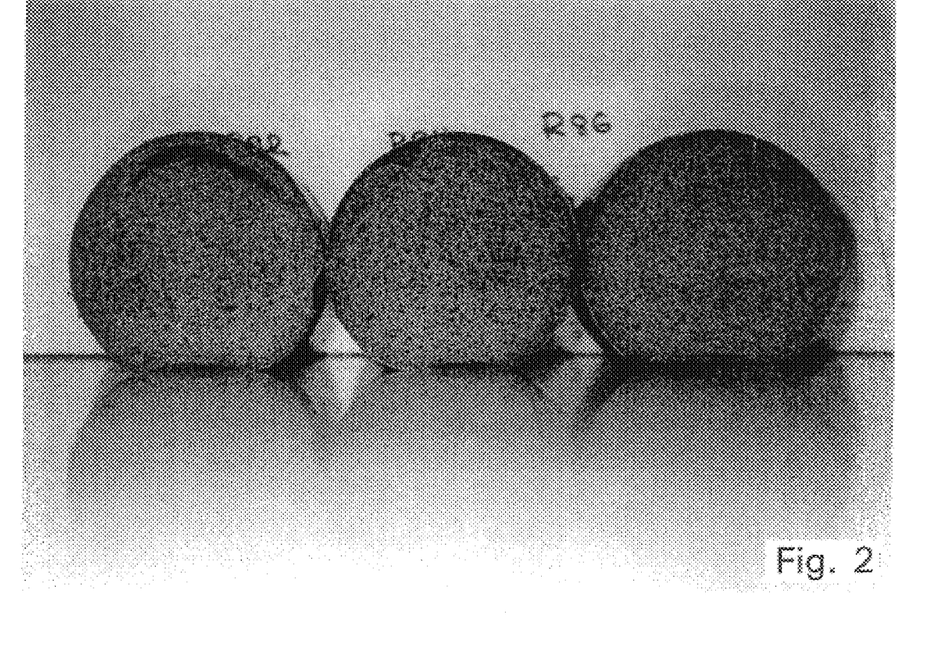
FIG. 2 shows the baking results when the product is kept from the start of the raising step through the baking step in a nonwoven material wrapper.
Figure 3:
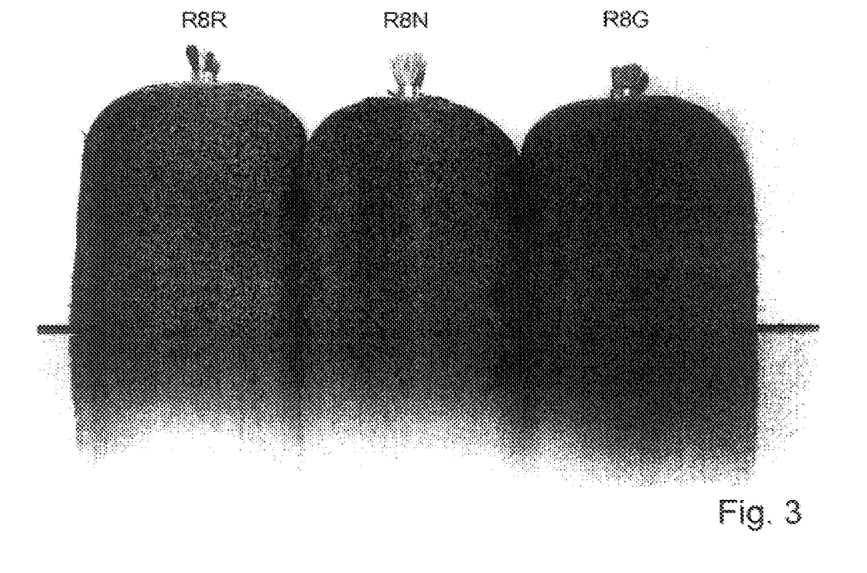
FIG. 3 shows the cross sections of the breads illustrated in FIG. 2.

The outcome of this baking example is illustrated in appended photographs of FIGS. 1–3 in which:

FIG. 1 shows the cross sections of a pan-baking process in which three rye breads were made by pan-baking. Bread sample R8R was made starting from locally prepared leaven. Bread sample R8N was made in the same manner as the first sample, however, using commercially available dry leaven. The third bread sample R8G contained 3% wheat gluten and was also made using a dry leaven.

FIG. 2 shows the baking outcome when the product was kept from the start of the raising step through the baking step packed in a viscose-cellulose based nonwoven material wrapper. The pictures show the cross sections of the breads. The compositions of the sample bread doughs in this test were the same as those of the baking test illustrated in FIG. 1.

FIG. 3 shows the cross sections of the breads illustrated in FIG. 2.

A comparison of the bread samples manufactured by the method according to the invention and having the structure shown in FIGS. 2 and 3 to equivalent samples made by conventional means with the result shown in FIG. 1, it can be seen that the method according to the invention is suitable for making rye bread and gives a good-quality end product. Also the taste tests performed on the manufactured breads gave good results.

EXAMPLE 2

Manufacture of a Wheat Bread Product from a Low-protein Wheat Variety

The composition of the product was as follows:

| Component Weight | [kg] | % of flour weight |
|---|---|---|
| Wheat flour | 20 | 100 |
| Dry yeast | 0.15 | |
| Salt | 0.3 | |
| Water (+16 °C.) | 15 | 75 |
| Total | 35.5 | |

The protein content of the wheat flour was 10% max (measured as nx6.25), the ash content 0.68% max, the moist gluten 25±2 and the sedimentation value (Zeleny) was 24 max.

The dough was prepared from the above-described raw materials into a vertical dough mixer. The mixing time was 3 min with the speed set at 2. The dough relax time was 5 min. Raising was carried out at 34–36° C. keeping the moisture content at 60–70%. The raising time was 40 min.

The product was baked at 210° C. for 30 min with the exhaust dampers of the oven held shut during baking.

The product was kept from the start of the raising step packed in a viscose-cellulose based nonwoven material wrapper.

Figure 4:
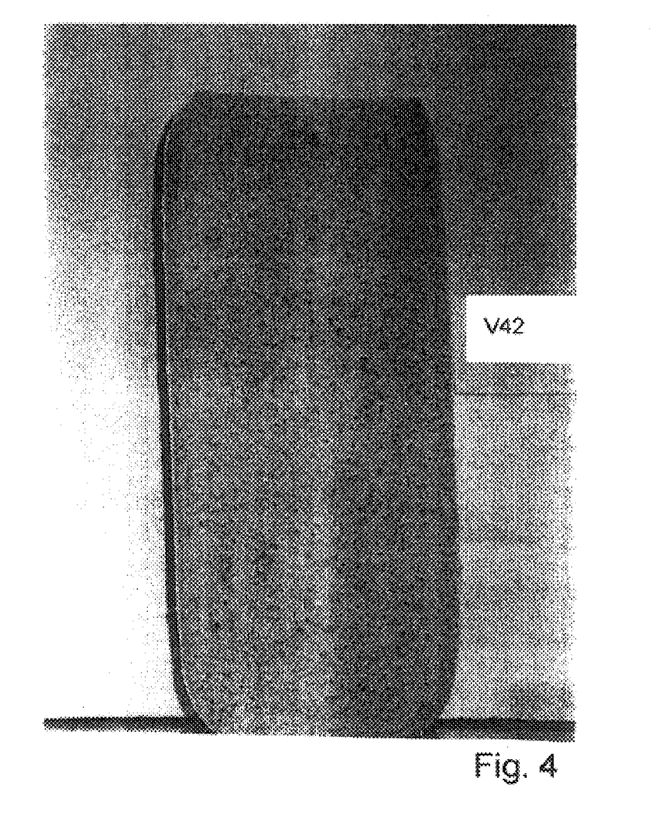
FIG. 4 is a cross section of a bread baked according to Example 2.

The cross section of bread baked in this example is shown in FIG. 4 illustrating a sample of a low-gluten wheat bread manufactured by the method according to the invention. As can be seen from the cross-sectional picture, the structure of the bread is good in spite of the low protein content.

EXAMPLE 3

Manufacture of a Wheat Bread Product from a Biologically-grown Wheat Variety The composition of the product was as follows:

| Component Weight | [kg] | % of flour weight |
|---|---|---|
| Wheat flour (biologically grown) | 20 | 100 |
| Dry yeast | 0.15 | |
| Salt | 0.3 | |
| Water (+20 °C.) | 15 | 75 |
| Total | 35.5 | |

The wheat flour used was a commercial variety grown by biological methods with the following specifications: moisture content 13.7%, falling number 310 (Hackberg), gluten 25%, protein content 12.6%, ash content 0.80%.

The particle distribution of the milled flour was:

| | |
|---|---|
| 265 μm or greater | 0.16% |
| 200 μm or greater | 13% |
| 150 μm or greater | 30% |
| 125 μm or greater | 21% |

The dough was prepared using a dual-spiral mixer (type VMI) using a mixing time of 8 min with the speed set at 1. The dough relax time was 10 min at room temperature (20–22° C.).

The product was baked at 210° C. in a single-rack air-circulating oven made by Revent. The baking time was 45 min with the exhaust dampers of the oven held shut during baking. The raising cabinet was a double-rack indirectly-heated Lillnord AS proofer/retarder.

Figure 5:
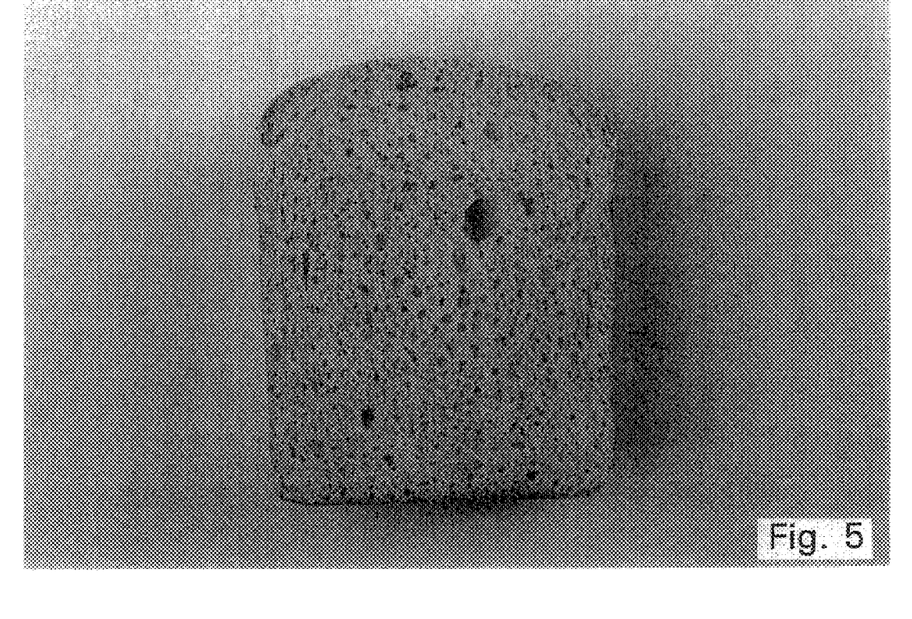
FIG. 5 is a cross section of a pan baked bread.

In FIG. 5 is shown the cross section of a pan-baked bread made conventionally from the above-specified flour variety (dough piece weight 500 g, pan dimensions 190 mm×180 mm×70 mm, raising time 60 min, baking time 30 min).

Figure 6:
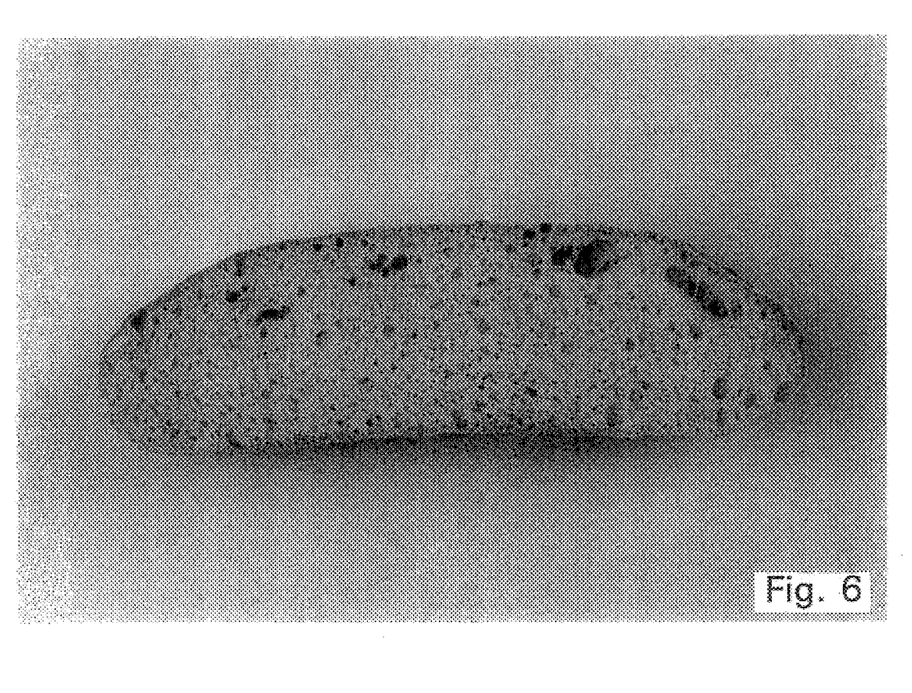
FIG. 6 is a cross section of an open-pan-baked bread molded conventionally by manual methods into a round shape.

In FIG. 6 is shown the cross section of a corresponding open-pan-baked bread moulded conventionally by manual methods into a round shape. (Dough piece weight 500 g, raising time 60 min, baking time 30 min).

Figure 7:
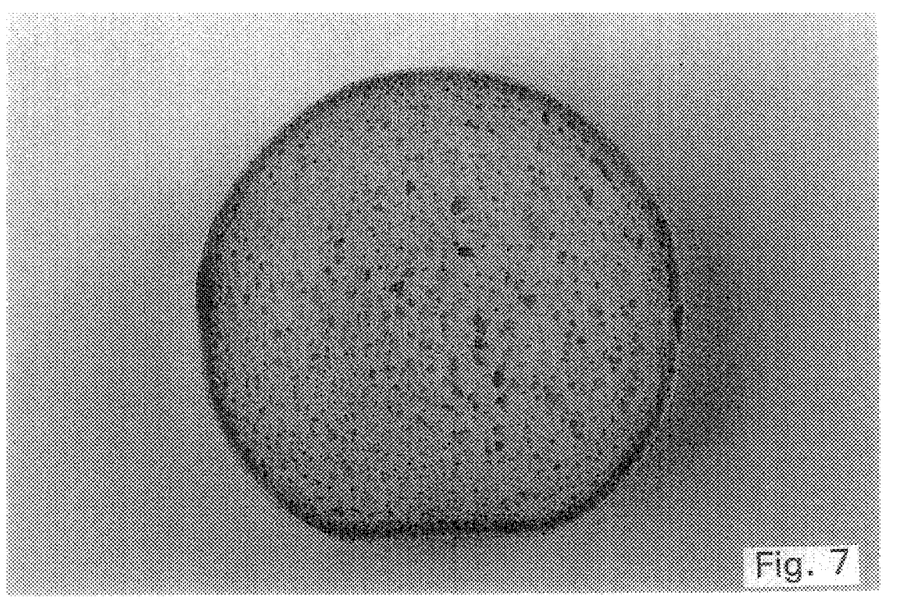
FIG. 7 is a cross section of bread made according to the present invention.

In FIG. 7 is shown the cross section of a bread made according to the invention. During the baking of the bread in the above-described process by the method according to the invention, the bread was kept packed in a viscose-cellulose based nonwoven material wrapper.

As can be seen from FIGS. 5, 6 and 7, the present method provides a good result with biologically grown cereal and the pore structure as well as the taste quality of the product is at least as good as is achievable by the highest quality of traditional baking (cf. FIGS. 5 and 6). A further benefit is that the present method readily provides a dark, good crust of a delicious taste.

EXAMPLE 4

Manufacture of a Gluten-free White Bread Product

In this test, bread samples were manufactured in a similar manner as in Example 3 from commercially available, gluten-free flour marketed for customers suffering from celiac disease. The flour variety used was a commercial flour mix marketed by Raisio Corp. with the following composition: wheat starch, rice flour, sugar beet fiber, flaked potato, sugar, flaked carrot, salt, iron, niacin, vitamin B1, vitamin B2 and vitamin B6.

The composition of the white, gluten-free bread product was as follows:

| Component Weight | [kg] | % of flour weight |
|---|---|---|
| Gluten-free bread flour mix | 12 | 100 |
| Dry yeast | 0.2 | |
| Salt | 0.1 | |
| Vegetable-oil-based baking fat | 1.0 | |
| Water (+22 °C.) | 10 | 83.3 |
| Total | 23.0 | |

The dough was prepared using a dual-spiral mixer (type VMI) using a mixing time of 6 min with the speed set at 1. The dough relaxing time was 10 min at room temperature (20–22° C.).

The product was raised in a single-rack indirectly-heated Lillnord AS retarder/proofer at 34–36° C. and 60–70% RH. The raising time was 15 min.

The product was baked in a single-rack Revent air-circulating oven at 200° C. The baking time was 45 min with the exhaust dampers of the oven held shut during baking.

Figure 8:
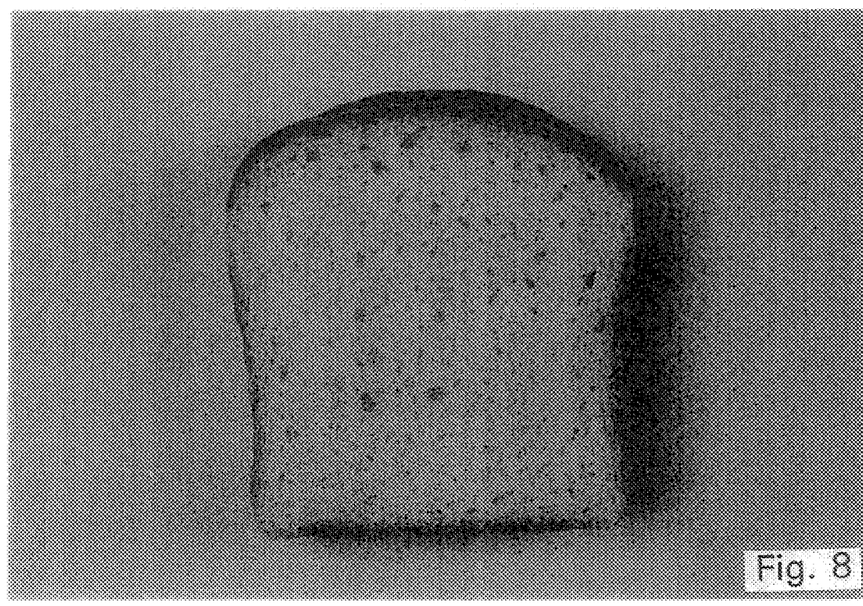
FIG. 8 shows a cross section of a convention pan-baked bread.

In FIG. 8 is shown the cross section of a pan-baked bread made conventionally (without a wrapper) from the above-specified flour variety with a dough piece weight 500 g and using a pan with dimensions 190 mm×180 mm×70 mm. The raising time was 30 min and the baking time 30 min.

Figure 9:
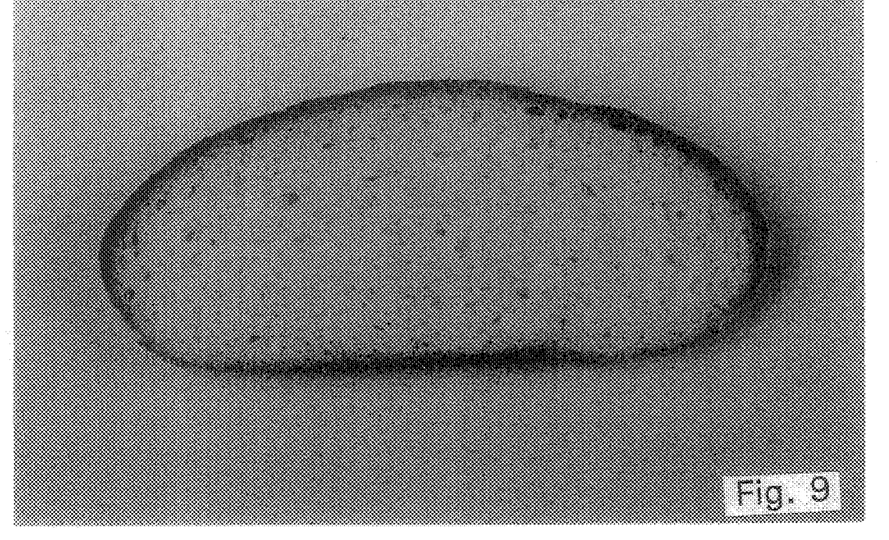
FIG. 9 shows a cross section of an open-pan-baked bread mold conventionally by normal means into a round shape.

In FIG. 9 is shown the cross section of a corresponding open-pan-baked, white, gluten-free bread made conventionally by manual methods. Dough piece weight was 500 g, raising time 30 min and baking time 30 min.

Figure 10:
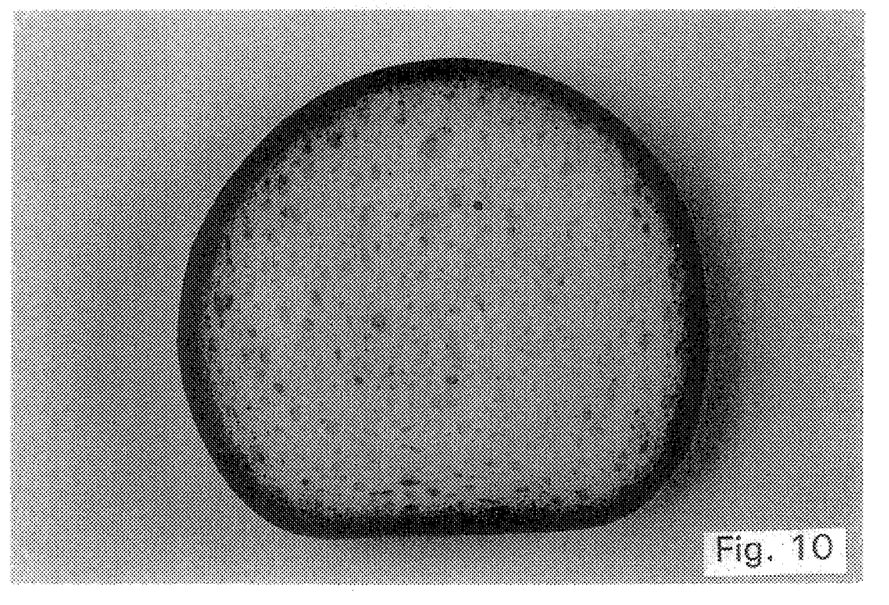
FIG. 10 is a cross section of a bread made according to the present invention.

In FIG. 10 is shown the cross section of a bread made according to the invention. During the baking, the bread was kept packed in a viscose-cellulose based nonwoven material wrapper.

As can be seen from FIGS. 8, 9 and 10, the method according to the method (cf. FIG. 10) provides a product of competitive qualities as evaluated by subjective criteria. It must be further noted that the method according to the invention provides the bread with dark and good-looking crust.

The method according to the invention was implemented using a wrapper material made from regenerated cellulose (45–50%), long-fiber paper (20–25%), a plasticizer and water (25–30%). The wrapper material is compatible with the requirements of foodstuff packaging standards and is made by Oy Visko Ab (Hanko, Finland). The material is durable at the temperatures encountered in baking, has elastic extensibility and shrink properties and offers easy peel either as such or when its surface is treated with a release agent. Furthermore, the wrapper material is porous and has a limited permeability to moisture and gases. The elongation of the material is about 12–20% under a pressure differential of 30 kPa and its water vapour transmission at room temperature is 150–250 g/m$^2$*day.

The wrapper material can be perforated by a sparsely spiked tool H-32 in order to accelerate the transmission of gases and moisture at a sufficiently high rate in the beginning of the baking process. At a later stage of the baking process when the baking space formed by the wrapper is full of the product, such a sparse perforation has only a local effect in the immediate vicinity of the product surface. The porosity of the wrapper material can essentially provide the passageway to transmission of moisture and gases away from the major part of the surface area of the baked product being in contact with the wrapper.

The surface smoothness of the wrapper material in Bendtsen tests is in the order of 300–500 ml/min (inner surface) and 800–1200 ml/min (outer surface).

Investigations into the method according to the invention have also shown that the elasticity of the packaging material combined with incomplete filling of the wrapper bag facilitate well-controlled raising before baking, as well as elevated baking temperatures or long baking times when so required, without a tear risk of the wrapper material. Simultaneously, the wrapper material acts as a support material during the baking process for a low-gluten dough of high water content, thus rendering the end product a spongy and appetizing gluten as well as allowing the product to form a good crust during baking.

As can be seen, the implementation of the baking method according to the invention offers benefits to be achieved already with conventional dough composition therethrough that the drying of the baked product will take place at a slower rate than in open-hearth baking or pan-baking. Resultingly, the baking temperature can be lowered and the baking time extended respectively, whereby the taste of the end product is improved. On the other hand, other benefits are attained in products conventionally manufactured by open-pan baking. In these baked products, it will be possible to use a higher water content of the dough, because the dough piece can now be handled wrapped in a package, whereby the importance of form retention of the dough piece is eliminated. Such an application can be found, e.g., in the baking of a bread product from a dough of inferior form retention or a dough made from a grain variety of low gluten.

The wrapper material used in the manufacture of a baked product can be made entirely from a sheet material compatible with the above-stated specifications, or alternatively, the invention may be implemented by having only a portion of the product wrapper made from such a gas/moisture-transmissive wrapper material. Then, the other portion of the package can be made from a material of an otherwise similar properties except for having an essentially denser structure. This type of wrapper design may be advantageous, e.g., in the baking of fat-containing products, whereby the fat-collecting pan normally required in their manufacture can be omitted.

When desired, the post-baking behaviour of a baked product can be influenced by a separate treatment aiming to modify the properties of the wrapper material used as the product package into a direction more suitable for storage. Such a post-processing treatment makes it possible, e.g., to reduce the porosity of the wrapper material to a lower value from that required for optimal moisture transmission during baking. For instance, the pores of the package can be plugged after baking with the help of, e.g., a cellulose derivative and/or other agents of varying composition if so required in order to extend the shelf life of the product.

While the package formed by the wrapper may have a shape compatible with any particular need, in practice a tubular shape is most advantageous in mass production. Then, the baking space allocated for each product can be readily filled leaving a due reserve space for product expansion during raising and baking. A guideline value for bread-making is to partially fill the wrapper by 15–95% of the total volume of the wrapper package. Due to the elasticity of the package, the end product may have a round, oblong, short, oval or any desired shape that can be formed with the help of a separate support material element or a suitable design of the packaging material thickness.

The scope of the invention also covers the manufacture of pan-baked products, whereby the product is entirely enclosed in the wrapper and this entity is placed in a pan for baking therein. This baking method is suitable for baking fat-containing products, for instance, or when a certain shape is desired to be given to the product. After baking, the product is removed from the pan and can be transferred to delivery and sales still remaining enclosed in the package.

The method according to the invention also facilitates deep-freezing either prior or after raising and/or prebaking or baking.

The dosing, raising and/or prebaking steps of the dough mass into the wrapper can be performed both temporally and/or physically far removed from the postprocessing site of the dough piece. Hence, a product packaged in the wrapper can be transported, e.g., in a deep-frozen form to a retail store or directly to the end-user location, where the required final raising and/or baking steps are performed.

The method according to the invention may be combined with the use of different enzymatic, chemical or other additives or improvers that serve to improve the gluten of the product or to remove the same, or to improve the sponginess, shelf life, taste or other properties of the product. In particular, the moisture content of the bread, which is an essential factor of baking and tends to escape under the conditions of the baking process, thus deteriorating the quality of bread, can be elevated by the invention to such a high value in open-pan baking that would make conventional baking awkward or in commercial production even impossible without the use of a pan.

In conjunction with the present invention, it was also found that the elastic properties of the wrapper material in combination with its permeability to moisture, high strength and resistance to high temperature give a possibility of consistent control of the baking process from the dosing of the dough into the wrapper in a continuous manner so that the packaging material used acts as a support and product shaper by flexibly yielding and expanding under the pressure of the released steam and/or expansion of the product, subsequently being capable of regaining some of its original shape, and moreover, performs as a coloured user package with the required textual and visual information elements printed thereon.

Operation according to the method permits the use of a continuous and integrated baking process starting from the dosing step of dough/batter into the wrapper, employing partial filling of the wrapper volume if so required, through the raising step and extending after the baking step up to the storage and delivery of the product in a single wrapper that also acts as a consumer package in product delivery.

The method is particularly suited for use with such wheat flour varieties that have a low gluten or other properties of inferior quality and with entirely gluten-free flour mixes. Poor baking qualities form a particular problem in low-gluten baked products, gluten-free baked products, natural products having a high fiber content and containing rye and/or oat components of health-improving qualities, and also frequently in products designed for special diets. Also baking from a flour variety made from biologically grown wheat typically having a constitution different from and of a lower quality than that of a normal wheat flour, the method provided a good raising and baking strength, and therethrough, a good end product.

The wrapper also acts as a logistic package for products to be delivered to a consumer, whereby the package is decorated with printed consumer information and a desired colouring scheme.

What is claimed is:

1. A method of manufacturing a baked product from dough in a wrapper cover of a certain volume, the method comprising the steps of dosing the dough into the wrapper cover volume, sealing the dough in the wrapper cover volume, and baking the product sealed in the wrapper cover volume, wherein the wrapper cover has a porous structure over at least a part of the baking volume and is capable of passing water vapor from the product to the baking oven atmosphere in order to attain a crust formation over said at least a part of the baking volume; and wherein said wrapper cover over the at least part of the baking volume, has a water vapor transmission of 150–250 $g/m^2*day$ at room temperature.

2. A method according to claim 1, wherein a wrapper cover is used over the at least a part of the baking volume, the wrapper being elastically deformable.

3. A method according to claim 2, wherein a dough is used having water-flour ratio of 110–75%.

4. A method according to claim 2, wherein the porous wrapper cover material is treated after the baking step in order to reduce its permeability.

5. A method according to claim 2, wherein the dough dosed into the wrapper cover volume is allowed to raise before the baking.

6. A method according to claim 2, wherein a dough is used having water-flour ratio of 80–70%.

7. A method according to claim 2, wherein a wrapper cover is used having an extensibility of about 12–20% under a one-sided pressure differential of 30 kPa.

8. A method according to claim 7, wherein a dough is used having water-flour ratio of 110–75%.

9. A method according to claim 7, wherein the porous wrapper cover material is treated after the baking step in order to reduce its permeability.

10. A method according to claim 7, wherein the dough dosed into the wrapper cover volume is allowed to raise before the baking.

11. A method according to claim 7, wherein a dough is used having water-flour ratio of 80–70%.

12. A method according to claim 1, wherein a dough is used having water-flour ratio of 110–75%.

13. A method according to claim 12, wherein the porous wrapper cover material is treated after the baking step in order to reduce its permeability.

14. A method according to claim 12, wherein the dough is dosed into the wrapper cover volume in the amount of 15–95% of its total volume.

15. A method according to claim 14, wherein the porous wrapper cover material is treated after the baking step in order to reduce its permeability.

16. A method according to claim 1, wherein the porous wrapper cover material is treated after the baking step in order to reduce its permeability.

17. A method according to claim 1, wherein the dough dosed into the wrapper cover volume is allowed to raise before the baking.

18. The method of claim 1, wherein the material for said wrapper is from 45–50% regenerated cellulose, 20–25% long-fiber paper and remainder being plasticizer and water.

19. A method according to claim 1, wherein a dough is used having water-flour ratio of 80–70%.

* * * * *